Feb. 21, 1939.　　　　E. V. SWANGREN　　　　2,148,248
MECHANISM FOR FEEDING AND CUTTING SHEET METAL
Original Filed Oct. 18, 1935　　7 Sheets-Sheet 1
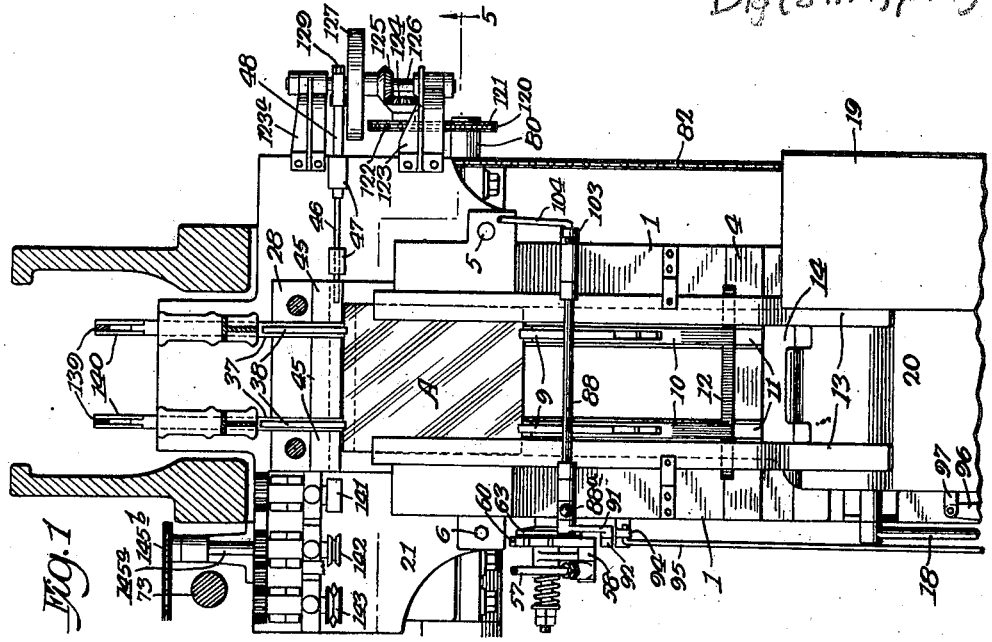
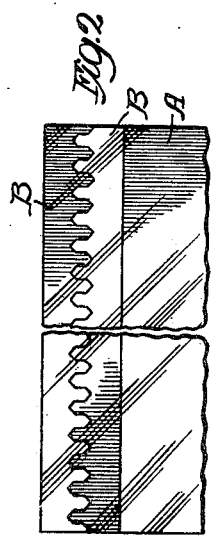
Inventor
Edwin V. Swangren
By Davis, Lindsey, Smith & Shonts
His Attorneys Feb. 21, 1939.     E. V. SWANGREN     2,148,248
MECHANISM FOR FEEDING AND CUTTING SHEET METAL
Original Filed Oct. 18, 1935     7 Sheets-Sheet 2
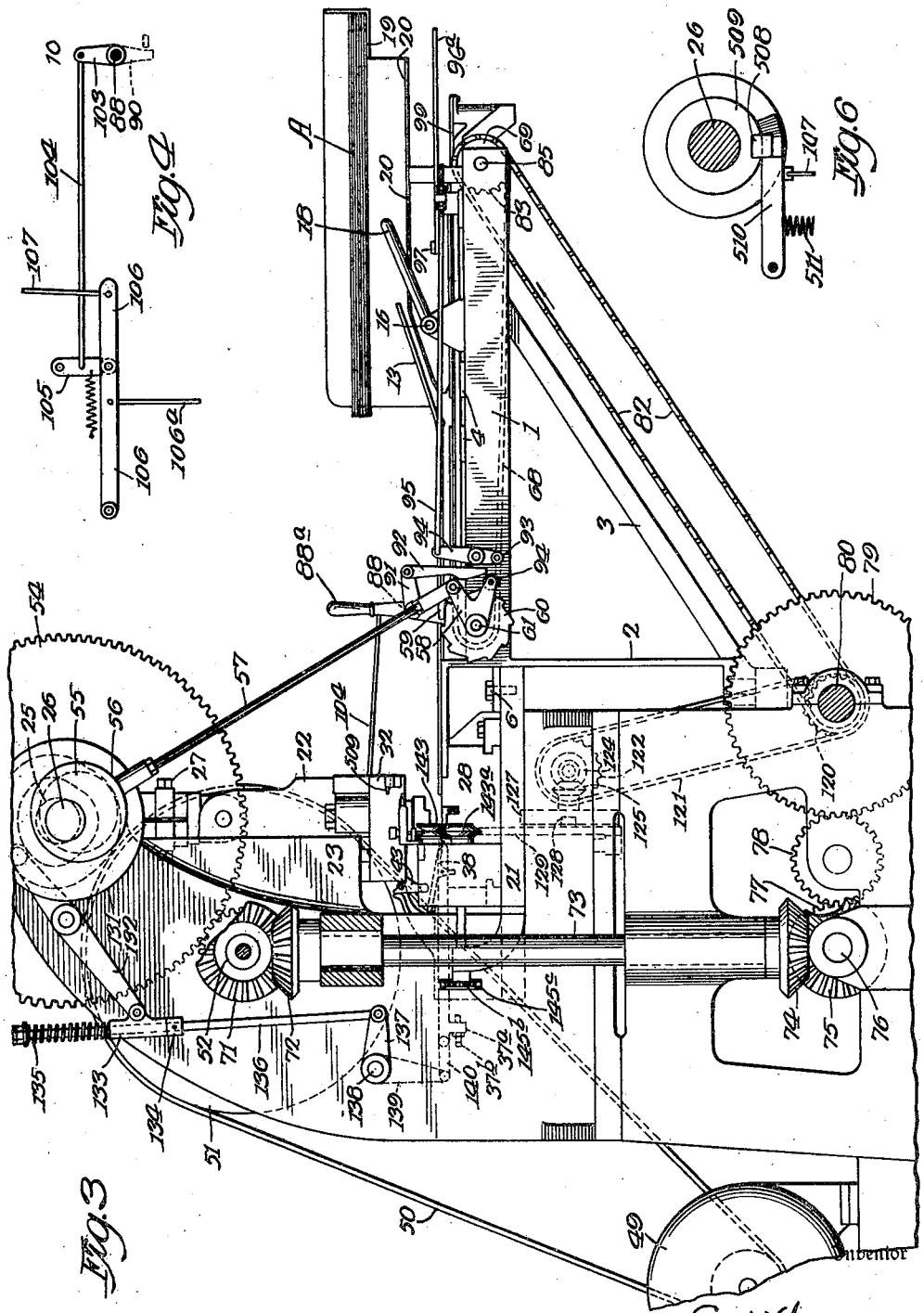

Feb. 21, 1939.  E. V. SWANGREN  2,148,248
MECHANISM FOR FEEDING AND CUTTING SHEET METAL
Original Filed Oct. 18, 1935   7 Sheets-Sheet 3
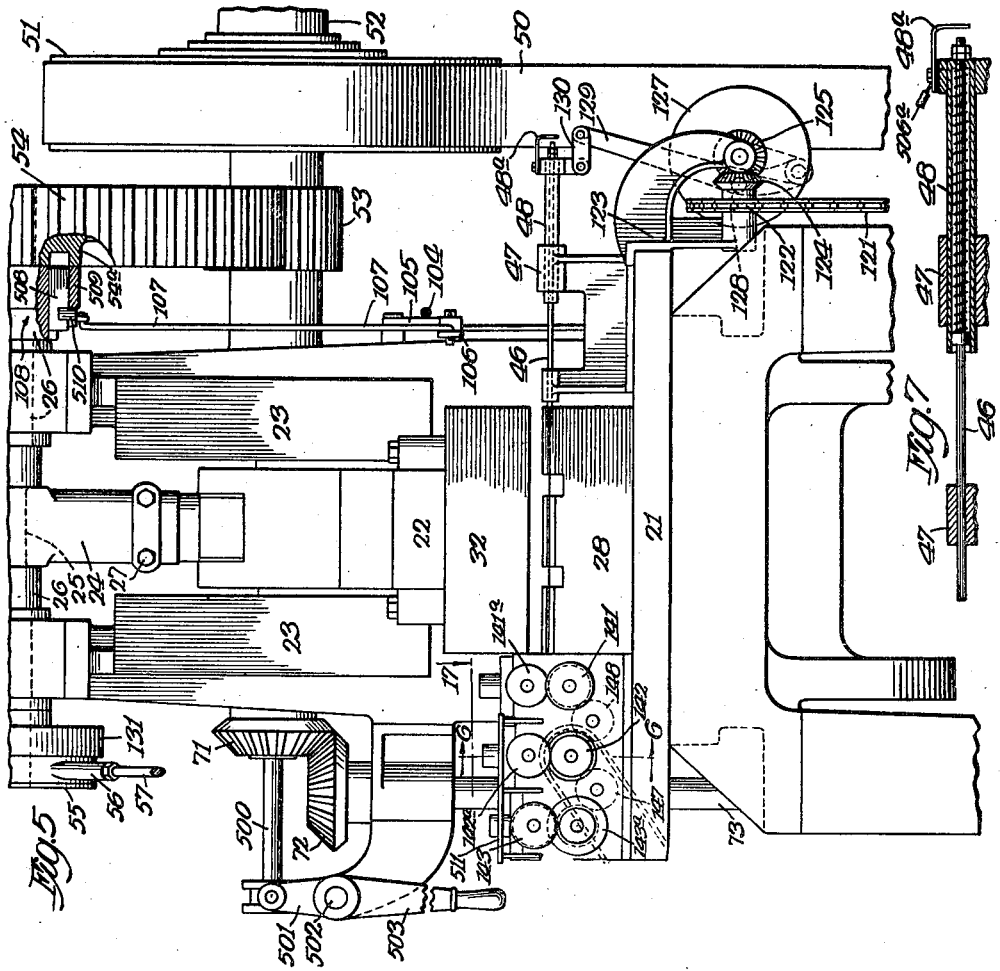
Inventor
Edwin V. Swangren
By Davis, Lindsey, Smith & Shonts
His Attorneys Feb. 21, 1939.  E. V. SWANGREN  2,148,248
MECHANISM FOR FEEDING AND CUTTING SHEET METAL
Original Filed Oct. 18, 1935  7 Sheets-Sheet 4
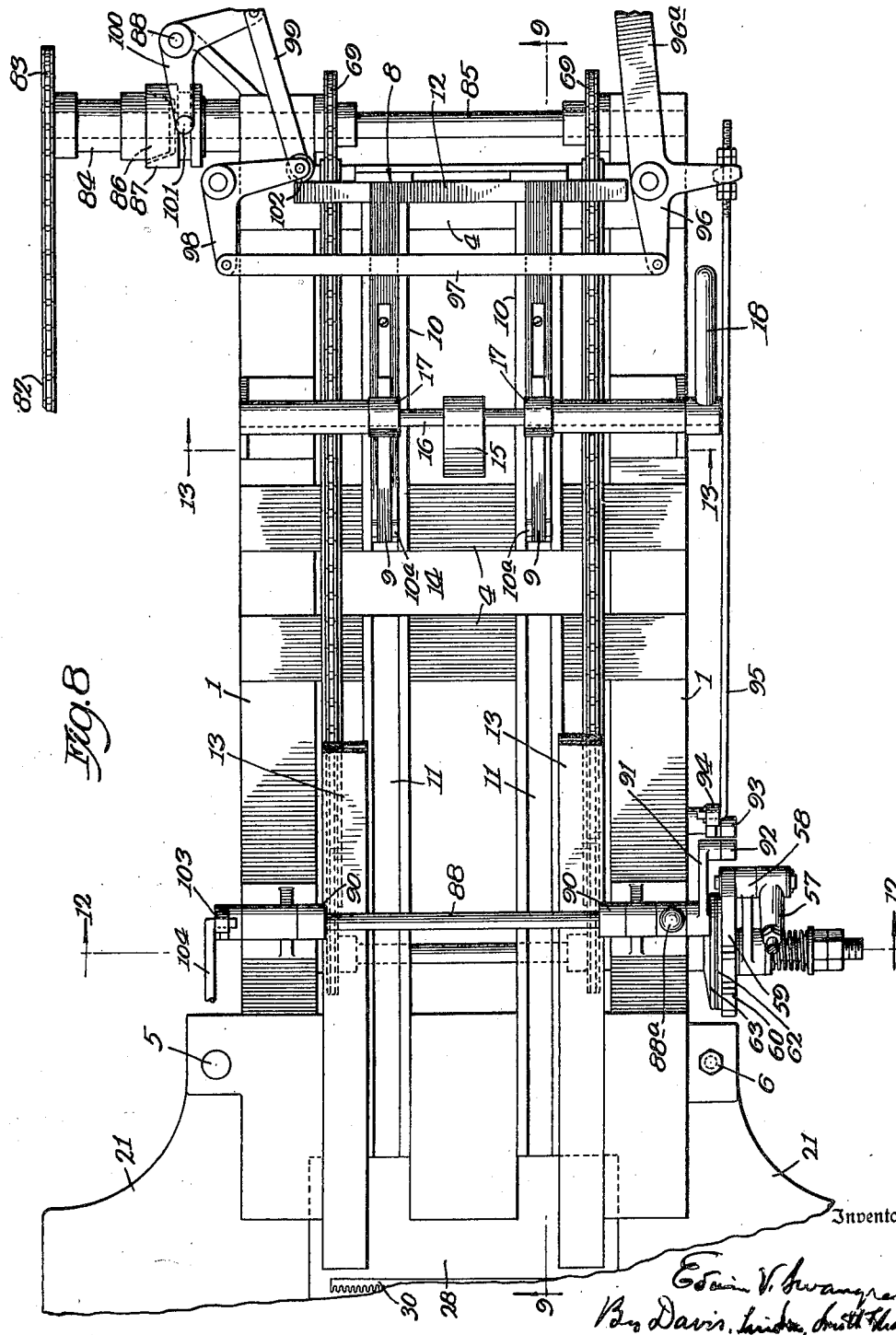
Inventor
Edwin V. Swangren
By Davis, Lindsey, Smith & Shonts
His Attorneys

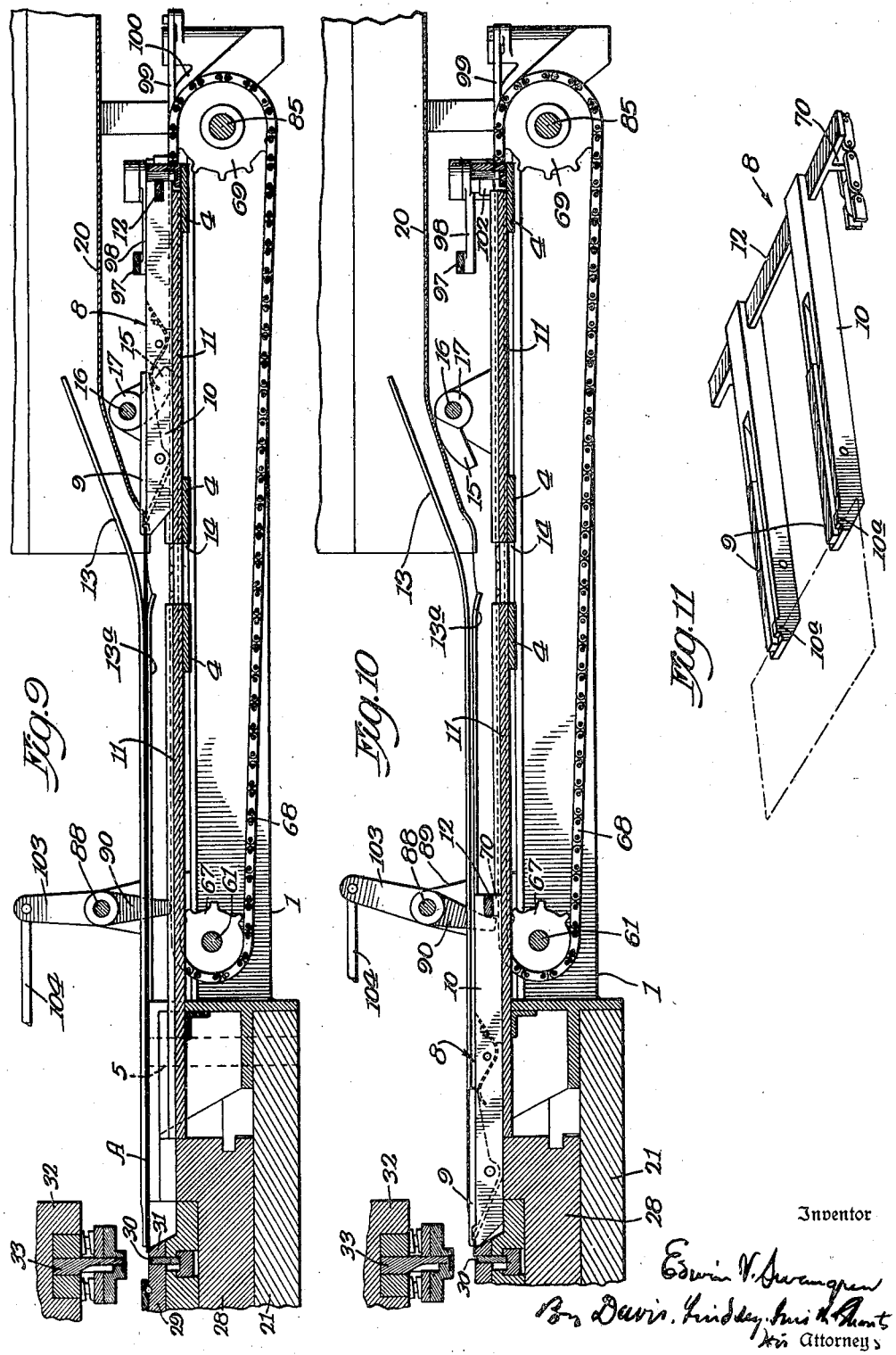

Feb. 21, 1939.  E. V. SWANGREN  2,148,248
MECHANISM FOR FEEDING AND CUTTING SHEET METAL
Original Filed Oct. 18, 1935  7 Sheets-Sheet 6
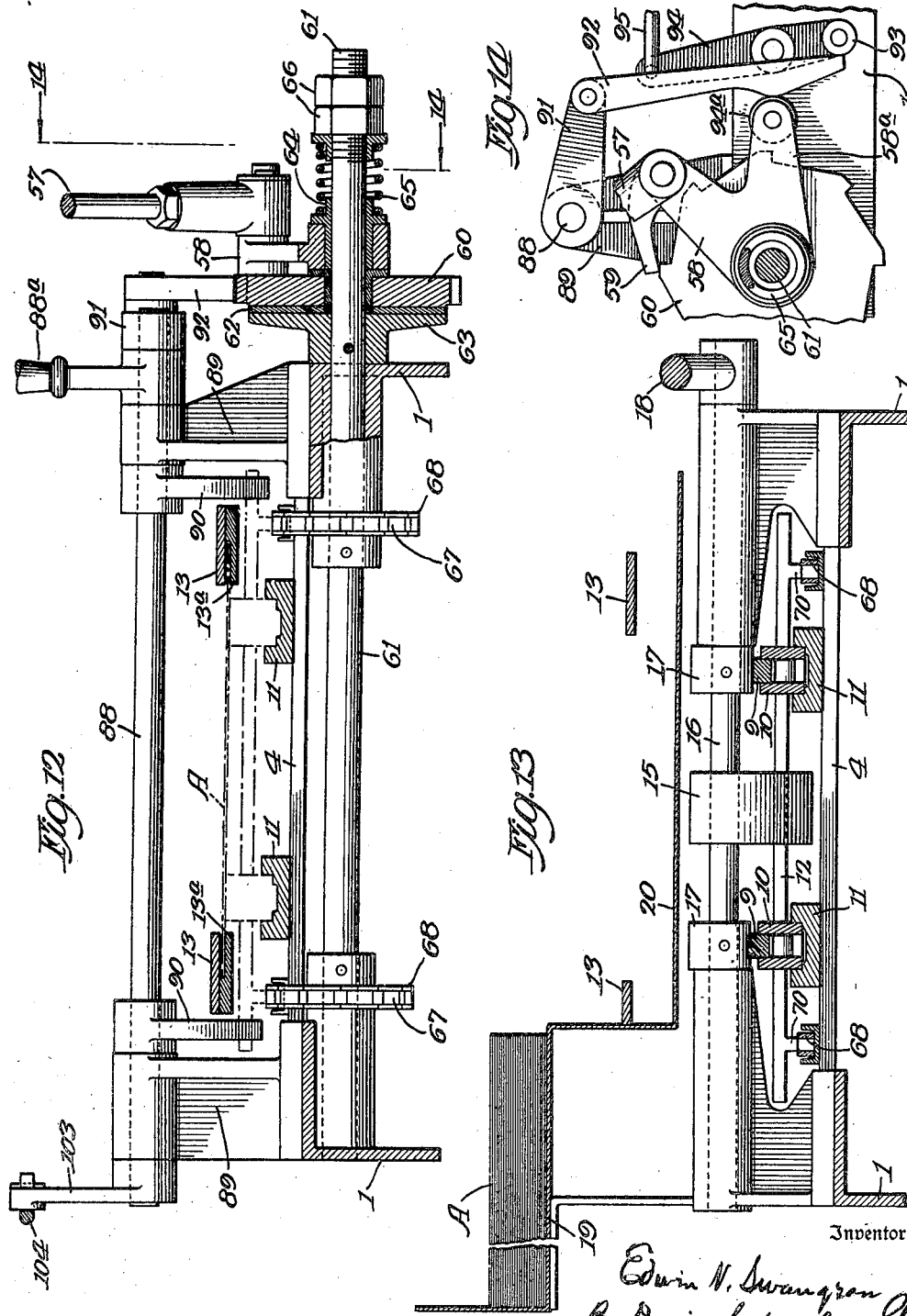
Inventor
Edwin V. Swangren
By Davis, Lindsey, Smith & Shonts
His Attorneys Feb. 21, 1939.  E. V. SWANGREN  2,148,248
MECHANISM FOR FEEDING AND CUTTING SHEET METAL
Original Filed Oct. 18, 1935  7 Sheets-Sheet 7

Patented Feb. 21, 1939

2,148,248

UNITED STATES PATENT OFFICE 2,148,248

MECHANISM FOR FEEDING AND CUTTING SHEET METAL

Edwin V. Swangren, Chicago, Ill.

Original application October 18, 1935, Serial No. 45,607. Divided and this application June 19, 1936, Serial No. 86,125

26 Claims. (Cl. 164—48)

My invention relates to a machine which I have invented and, more particularly, designed for the production on a large scale and at high speed of container covers or ends of a type consisting of a central fiber board disk connected to a sheet metal rim member, such as disclosed in Walter Patent No. 1,959,971, although certain combinations or parts and groups of mechanism in the machine may be valuable for use in machines for other purposes. In my pending application for patent filed October 18, 1935, Serial No. 45,607, I have described a complete, organized machine for the purpose indicated, and as a part of such machine, and incidental to use of the mechanisms and combinations of parts claimed as the subject matter of said application, I have devised novel sheet-feeding mechanism arranged to intermittently feed sheets of metal supplied by an operator and present the sheets step-by-step to a novel cutting press mechanism arranged to cut from the sheets pairs of toothed strips forming the metal elements of the combination of ends, each pair being first severed and the members separated from each other and then immediately frictionally reunited with their teeth intermeshing. The present application is a division of said pending application, restricted to and claiming the novel sheet metal feeding and cutting mechanism and associated parts, and the subject matter hereof relates to the oganization and combinations and subcombinations of parts and various details of construction of such feeding and cutting mechanism, and the organization and arrangement of the mechanical connections through which the various parts of the machine are timed and coordinated in action to accomplish the results described, as will be clearly apparent from the description hereinafter given, the essential elements of the invention forming the subject matter of this divisional specification being more particularly pointed out in the appended claims.

In the description hereinafter given of the machine embodying my invention as illustrated in the drawings, the front side of the machine, considered as a whole, will be regarded as that part shown at the lower side of Fig. 1, and at the right side of Fig. 3, and at the side nearest the point of view in Fig. 5; whereas in describing the movement of parts concerned in advancing the metal sheets and strips through the machine, the terms "forward" and "forwardly" will be used with reference to travel from a feeding or an intermediate advancing position towards the point of discharge of the finished can tops or ends, and "rearward" or "rearwardly" used to describe a return of parts in the reverse direction.

In the drawings Figure 1 is a plan view of the principal parts of my new machine, certain parts being sectioned and the parts thereabove omitted;

Fig. 2 is a fragmentary plan view of the forward end of one of the metal sheets operated upon by the sheet-cutting mechanism, the line of cut made by such mechanism being indicated thereon;

Fig. 3 is a vertical section through the machine, taken in a plane indicated by the dotted line 3—3 of Fig. 1 and looking in the direction of the arrow;

Fig. 4 is a fragmentary detail, showing detached a part of the connections for setting the machine in operation after a sheet metal blank has been secured to the sheet feeding frame by the operator, and for automatically stopping the machine and reversing the movement of the feed frame when it has reached the limit of its feeding movement;

Fig. 5 is a vertical transverse section of the central portion of the machine in a plane indicated by the dotted line 5—5 of Fig. 1, looking toward the rear of the machine;

Fig. 6 is a fragmentary detail of certain parts of the clutch on the actuating shaft of the cutting press, the plane of the section being indicated by the dotted line 3ª—3ª of Fig. 5;

Fig. 7 is a detail in section of a pusher rod for removing the severed strips from beneath the dies of the cutting mechanism;

Fig. 8 is a plan view of the sheet-feed frame or carriage, partly broken away to better show the construction of the parts;

Fig. 9 is a vertical longitudinal section of the sheet-feed carriage and portions of the supporting frame in a plane indicated by the dotted line 9—9 of Fig. 8, looking in the direction of the arrow, and showing the feed frame at the front end of the supporting frame;

Fig. 10 is a similar section showing the carriage at the rear point of its travel;

Fig. 11 is a perspective of the feed carriage, detached;

Fig. 12 is a transverse vertical section through the feed carriage and supporting frame in a plane indicated by the dotted line 12—12 of Fig. 8, looking toward the front of the machine;

Fig. 13 is a similar section in a different plane, as indicated by the dotted line 13—13 of Fig. 8;

Fig. 14 is a fragmentary detail of parts for automatically stopping the machine and reversing the travel of the feed carriage, the parts being shown in stopping position;

Like reference characters indicate like parts in all the figures of the drawings.

Figure 15:
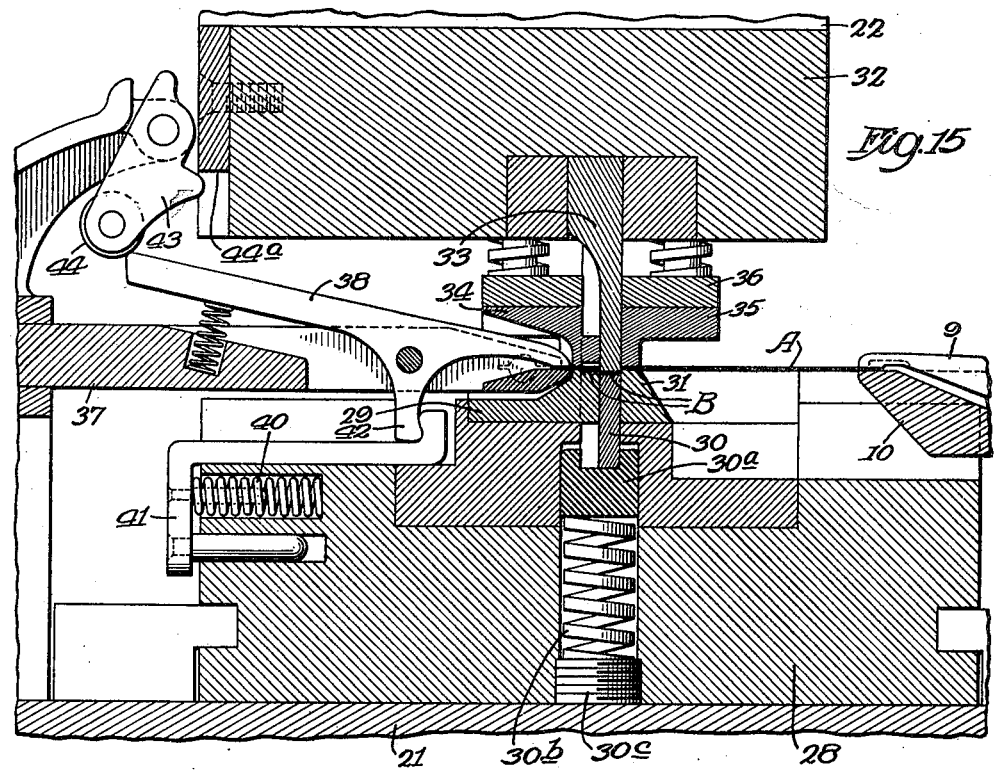
Fig. 15 is a vertical section through the die blocks of the sheet-cutting mechanism and certain associated parts at the end of a cutting stroke, shown in a plane running from front to rear.

Before proceeding to a detailed description of the machine illustrated in the drawings it may first be explained generally that it is entirely automatic in its operation except for the attention required of an operator in placing successive sheets of metal in the machine when the cutting press stops after each sheet has been completely cut up into strips and the feed frame or carriage has been automatically returned from its forward position adjacent to the cutting mechanism to rearward position and there stopped to permit a new sheet to be placed in the feed frame, and in then manually starting the machine again.

When thus started, after insertion of a fresh sheet, the sheet-feeding frame or carriage intermittenly moves forward, and beween each step in its movement the cutting mechanism severs from the forward edge of the sheet a rectangular portion of sheet metal and cuts the same into two intermeshing toothed sections or strips which are momentarily separated by the cutting press mechanism and then frictionally reunited by their mating, intermeshing toothed edges. The pairs of strips thus formed are then fed laterally to other mechanisms with which the present divisional application is not concerned.

The clutch elements through which the different mechanisms (which must be operated in timed relation) are connected and started and stopped are of such construction as to make operative engagement only at a definite angular relation to each other, whereby the timing of the parts may be adjusted to operate in synchronism with each other.

The stationary frame of the machine may consist of frame parts and sections of any suitable construction secured together in any desired manner and provided with bearing brackets and supporting parts suitably formed and arranged to accommodate the moving parts of the machine. In the particular machine illustrated the cutting press frame is constructed as a structural unit to which the supporting frame of the sheet-feeding carriage is hinged and adapted to be bolted.

*Sheet-feeding mechanism*

Describing now in detail the mechanism to which the present specification relates, as shown in the drawings, the hinged sheet-feed supporting frame before mentioned includes a pair of horizontal side members 1, a pair of vertical rear members 2, a pair of inclined side members 3, cross-members 4, and suitable bracket and other supporting members to support the moving parts of the sheet-feeding mechanism. The frame as a whole is pivoted to the cutting press frame upon vertical pivots 5 and is secured to the last mentioned frame in fixed position by bolts 6 which may be removed to permit the sheet-feed frame to be swung aside so that access may be had to the dies and other adjacent parts of the cutting press—see Figs. 1, 3 and 8.

Slidingly mounted in the pivoted supporting frame is a feed frame or carriage 8 (see Figs. 11, 8, 9 and 10) equipped with pivoted spring-pressed grippers 9, which carriage is shifted rearwardly of the machine with a step-by-step movement, and returned by a continuous movement through connections later to be described.

The sliding feed frame includes side bars 10 slidingly engaging track-rails 11 carried by the supporting frame, and a rear cross-bar or stop bar 12, the ends of which project oppositely beyond the side-bars—see Fig. 11. At the front end of the sliding feed frame the spring-pressed grippers 9 before mentioned are pivotally mounted in slots in the side bars 10 of the feed carriage, and their front ends are arranged to grip the sheets A to be operated upon, which are inserted (when the sliding frame is in rearmost position) by the operator between pairs of opposite upper sheet guides 13 and lower guides 13$^a$, carried by the supporting frame, the rear end of the guides 13 being bent upwardly to facilitate insertion of the sheets—see Figs. 8, 9 and 10.

The front ends of the grippers 9 project beyond shoulders 10$^a$ on the side-bars 10 which serve to position the sheets A accurately against the front ends of such bars and provide a clamping face to cooperate with the grippers. The front or inner ends of the sheet guides 13 and 13$^a$ extend nearly to the plane of the cutting members of the cutting press later to be described, and at the forward end of travel of the feed frame the side-bars 10 extend into recesses formed in the frame members of the cutting press and the lower die back of said press—see Figs. 9 and 10.

When the feed frame returns to rearward position, after the sheet secured by the grippers has all been cut into strips (except a narrow waste strip clamped by the grippers) the gripper jaws are automatically released at a point above a waste opening 14 in the carriage frame through the camming action of a pair of flatsided disks 17 secured to a rock shaft 16 journaled in supporting frame, which, when their curved peripheral surfaces are lowermost, as shown in Fig. 10, lie in the path of the grippers and force their rear ends downwardly as the feed frame returns to rearward position, thus releasing the gripper jaws. After a fresh sheet has been inserted in the sheet guides 13—13$^a$ the rod 16 is turned by a hand-lever 18 (see Figs. 3 and 8) to turn the flat faces of the disks 17 to the lowermost position shown in Fig. 9 and permit the jaws of the grippers 9 to clamp against the inserted sheet. As the feed frame afterwards advances in its feeding movement the rock shaft 16 and disks 17 are returned to the position shown in Fig. 10 by engagement of the cross-bar 12 of the feed frame with a short rock arm 15 secured to the rock shaft.

At the rear end of the supporting frame I have arranged in convenient position a magazine 19 for reception of a stack of sheet metal blanks A, and adjacent thereto a feed table 20 having a surface adapted to direct individual sheets taken from the stack into proper position between the sheet guides 13 and 13$^a$.

*Cutting press mechanism*

The mechanism for cutting the blanks A and severing the cut-off portions to form pairs of strips B—B, and then separating and immediately reuniting the strips and then delivering the reunited pair of strips successively to the strip-separating and transfer mechanism will next be described. The cutting press which operates to separate the sheet metal blanks into strips is of a well known type, employing lower dies stationarily supported in the bed 21 of the cutting press frame and upper dies carried in a vertically reciprocating head 22 which is slidingly mounted in guideways in guide members 23 of the frame and actuated by a pitman 24 having an eccentric strap engaging an eccentric 25 on the main cutting press actuating shaft 26.

The pitman, it may here be noted, is adjustable in length, to provide for exact adjustment and replacement with dies of different length and shape as may be required by changes in the machine to adapt it for operation in producing can tops of different sizes. This adjustment is effected by loosening bolts 27 which secure together upper and lower sections of the pitman, one of the sections being slotted to permit adjustment as desired, and then bolting the sections together in the desired position of adjustment.

The lower cutting members of the cutting press may conveniently be mounted in a lower die-block (see Figs. 15 and 16) stationarily mounted in the bed of the cutting press frame, and consist of a stationary forward die member 29, an intermediate yieldingly mounted die member 30, and a rear stationary die member 31, the terms "front" and "rear" being used with reference to the direction of travel of the sheets and strips through the machine, all being elongated bars extending transversely under the front edge of the sheet metal blanks to be operated upon. The rear edge of the yielding die member is straight and the forward edge toothed, or corrugated, to correspond with the outline of the intermeshing teeth between the two members of the double strip to be severed by the cutting operation,—see Fig. 2. This intermediate yielding member is mounted upon a supporting bar 30$^a$, stressed by a pair of springs 30$^b$, confined between such bar and plugs 30$^c$ seated in the lower die block 28. The forward lower die member 29 is formed along its rear side (the side extending toward the front of the machine) with corresponding teeth mating with the complementary teeth on the intermediate die member, said die member thus forming an anvil underlying the forward strip B of the double strip to be severed, i. e., the leading strip, while the rear die 31 forms an anvil under the portion of the sheet metal blank to the rear of the leading or forward strip B, and the yielding intermediate die is of the same outline as such rear strip B and underlies it.

The upper cutting members of the press may likewise be conveniently mounted, as illustrated, in an upper die block 32, secured to the reciprocated head 22 of the press. The intermediate punch member 33, which forms the cutting tool and is of the same outline as the yielding lower die 30 beneath it, and is formed with a straight rear edge arranged to cooperate with the edge of the lower rear stationary die member 31, and a toothed or corrugated forward edge adapted to cooperate with the correspondingly toothed edge of the lower forward stationary die member 29.

On opposite sides of the cutting member 33 are arranged yieldingly-supported forward and rear clamping and stripping members 34 and 35, respectively, which may conveniently be supported, as shown, by a spring-pressed bar 36 which slidably engages the punch tool 33. As the die head descends the rear clamping member 35 is arranged to clamp the sheet metal A against the lower rear stationary die member 31 immediately to the rear of the rear line of cut of the punch member 33, while the forward clamping member is arranged to clamp the forward one of the strips B to be severed from the sheet against the lower forward stationary die member 29 immediately forward of the line of the toothed intermeshing portions of said strips.

Figure 16:
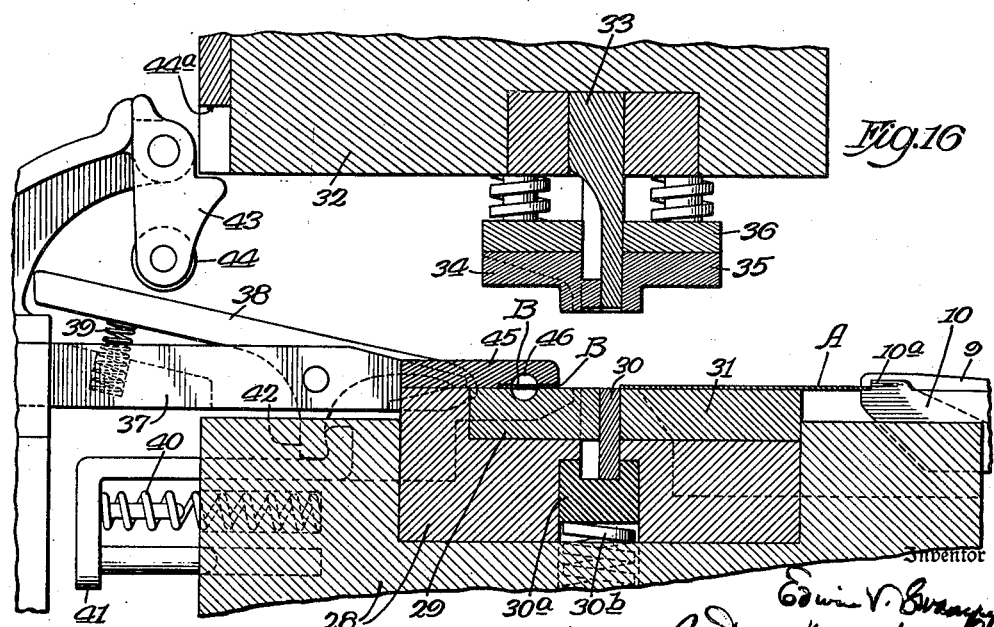
Fig. 16 is a similar view, but with the dies in separated position.

It may now be explained that upon descent of the cutting press head the forward portion of the blank A is severed from the body of the sheet, and this portion is also severed into two strips B—B, and the rear strip B is forced downwardly a short distance below the plane of the forward or mating one of the two strips, against the stress of the springs 30$^b$ (see Fig. 15). As the punch head ascends these springs 30$^b$ restore the rear strip, now completely severed, to the same plane as the front strip, which it frictionally engages, and as the punch continues to ascend the springs tensioning the holding and clamping members 34 and 35 of the punch act to strip the reconnected strips B—B from the intermediate upper punch tool, so that the connected double strip is free to be acted upon by grippers mounted upon a pair of simultaneously reciprocating bars next to be described, and thus withdrawn from the zone of the punching mechanism. The contour of the teeth is such that when the severed parts are reunited they will resist separation sufficiently to enable them to be handled as a unit, but may be separated by mechanism later to be described. In practice frictional engagement has been found sufficient, but if desired, a slight interlocking engagement may be provided by giving the teeth appropriate contour.

The reciprocating bars mentioned, marked 37, are slidingly mounted in recesses in the fixed frame members of the cutting press and the lower die block 28, and are severally equipped with rocking gripping members 38, disposed within top recesses formed in the inner ends of such bars. These bars are tensioned by springs 39 to stress the jaws at their inner ends into gripping relation with the inner ends of the bars,— see Figs. 15 and 16. The inner portions of said bars 37, it may here be explained, are shouldered in the same manner as the forward ends of the side-bars 10 of the feed frame or carriage 8 before described, to form a stop for the forward edge of the sheet metal blank as it is advanced by the sheet-feeding mechanism. In the present instance the tension of the springs 39 is supplemented by springs 40 acting against a sliding frame 41 having a hooked member engaging a short depending arm 42 on the gripper.

Above the path traversed by each gripper 38 is arranged a rocking cam block 43, pivotally mounted on a bracket carried by the frame of the punch press and equipped with a cam roller 44. Each block 43 is formed with a shoulder arranged to cooperate with a shoulder 44$^a$ forming the upper part of a recess in the head structure adjacent the upper die block 32. The construction and arrangement of the parts is such that as the bars move forwardly from the position shown in Fig. 16 to the position shown in Fig. 15, while the press head is raised, the two grippers will be cammed to open position. After the metal sheet has been advanced to forward position and stopped against the shouldered ends of the bars 37, and as the press head then descends, the shoulder 44$^a$ on the press head rocks the two cam blocks outwardly, and when the rollers 44 clear the grippers 38, the springs 39 and 40 will act to quickly restore the grippers to clamping position of the jaws against the forward portion of the sheet A which is to be severed by the punch press and becomes the forward one of the pair of connected strips B—B. This clamping engagement continues while the cutting operation proceeds as above described, and after the severed rear strip B of the double strip has been restored to reengagement (now frictional) with the front strip, the reciprocating bars shift outwardly and carry the double strip beneath recesses in aligned stop bars 45 arranged forwardly of the punching members, the grippers riding off the upper faces of the strips in the further movement of the bars 37. The cam blocks 43 are free to rock to permit the grippers 38 to ride under them, after which they gravitate to the vertical position shown in Fig. 16.

During the interim between the outward movement of the bars 37 and grippers 38, after they have pulled the connected two-piece strip underneath the recesses in the stop bars 45 and have passed out of engagement with the strips, and the return inward movement of such bars, the double strip B—B is shifted transversely out of the path of the next strips to be severed by the quick movement of a push rod 46 slidingly mounted in a stationary bracket 47 on the stamping press frame and extending through stationary parts of such frame. This push rod, to avoid breakage in case of jamming of the strips, is mounted in a spring barrel 48 through which it is actuated,—see Fig. 7.

*Connections for operating sheet-feed and cutting press mechanisms*

The operating connections through which the parts thus far described are actuated may next be described.

The driving pulley of the electric motor 49 employed in the present instance as a source of power is connected by a belt 50 with a pulley 51 arranged to be clutched to the main power shaft 52 of the machine—see Figs. 3 and 5. The shaft 52 carries a small gear wheel 53 meshing with a large gear wheel 54, the hub of which is rotatably mounted upon the cutting press actuating shaft 26 before referred to, and is arranged to be clutched thereto and disconnected therefrom, as will later be more fully explained.

The sheet-feed frame is given its intermittent, forward, feeding movement through an eccentric 55 on the cutting press shaft, the strap 56 of which is connected by a pitman rod 57 with an oscillating pawl-carrying arm 58 carrying a pawl 59 cooperating with a ratchet wheel 60 rotatably mounted on a shaft 61 journaled in the opposite side members of the pivoted supporting frame in which the feed frame or carriage for feeding the sheet metal blanks is slidingly mounted,—see Fig. 3. The ratchet wheel 60 is arranged to frictionally rotate the shaft 61 with provision for a desirable amount of slippage at each movement of the ratchet wheel through a friction disk 62 engaging the side face of a disk 63 secured to said shaft, and means are provided for regulating the resistance to slippage consisting of a flanged collar 64 bearing against the ratchet wheel and stressed by a spring 65 which may be varied in tension by adjusting nuts 66. The collar 64 also serves as a pivot for the ratchet arm 58,—see Fig. 12.

To the shaft 61 is secured a pair of sprocket wheels 67—67 (see Figs. 9, 10 and 12) which are connected by sprocket chains 68—68 with a pair of rear sprocket wheels 69—69. The rear crossbar of stop bar 12 of the feed frame or carriage is connected by a pair of opposite depending lugs 70—70 with the upper reach of the sprocket chains, so as to be shifted thereby. The actuation of the ratchet wheel thus brings about a step-by-step forward movement of the feed frame, and as the stroke given the pawl is slightly in excess of the required feeding movement the leading edge of the sheet metal blank is forced firmly against the stop shoulders formed on the inner ends of the reciprocating bars 37 which carry the grippers 39, a slight slippage between the friction disk 62 and the disk 63 occurring after the sheet has been thus accurately stopped in proper position between the die members of the cutting press mechanism.

At the end of the final feeding stroke the feed frame has been shifted to the extreme forward position shown in Fig. 10, and after the cutting mechanism has severed the last double strip from the sheet metal blank being operated upon, the carriage is returned to rearward position (at the front side of the machine) by the following connections. The main operating shaft 52 of the machine, which during the running of the machine is continuously driven by the motor, carries a bevel gear wheel 71 meshing with a bevel gear 72 secured to a vertical shaft 73 journaled in suitable bearings carried by the cutting press frame. Secured to the lower end of this shaft is a bevel gear 74 meshing with a bevel gear 75 on a horizontal shaft 76 at the rear side of the machine. To this shaft 76 is secured a gear wheel 77 meshing with a pinion 78 on a shaft journaled in the frame of the machine, and this pinion meshes with a large gear wheel 79 secured to a horizontal shaft 80 extending transversely of the machine near its base, and which it may here be stated drives the mechanism arranged in the turret section of the machine and certain intermediate mechanisms. Near the outer end of this shaft 80 there is secured thereto a sprocket wheel 81 engaging an upwardly and forwardly extending sprocket chain 82 which is also engaged by a sprocket wheel 83, the hub 84 of which rotatably engages a shaft 85, and carries one member 86 of a cone clutch which is adapted to cooperate with a sliding clutch member 87 having splined connection with said shaft 85. The rear pair of sprocket wheels 69—69 before mentioned, which it will be remembered are engaged by the sprocket chains 68—68 connected to the feed frame, are secured to the shaft 85, and when the clutch members 86 and 87 are engaged this feed frame will be returned by the connections just described.

During the forward or feeding movement of the sheet-feed frame, the clutch members last referred to are of course out of engagement, and they are automatically reengaged through connections controlled by the return stroke of the sheet-feed actuating pawl-carrying arm 58 after the carriage has reached forward position and after the final double strip has been severed from the blank at the time being operated upon.

For the purpose of interrupting the action of the cutting press while the sheet-feed frame is being returned to rearward position, I have provided a rock shaft 88 journaled in bearing brackets 89—89 on the supporting frame for the traveling feed frame and carrying a pair of depending rock arms 90—90 in the path of the stop bar of the feed frame arranged to rock the shaft 88 at the last forward strip of such frame, see Figs. 3, 12 and 14. This rock shaft 88 has secured to its outer end (see Figs. 4, 5, 8 and 12) a rock arm 103 pivotally connected to a rod 104 which is connected to a spring tensioned blocking lever 105 pivoted at its top to a pivot carried by a frame member of the press. The lower end of this lever is formed with an arcuate face adapted to cooperate with a roller intermediately mounted upon a lever 106 which is pivoted at its rear end to the punch press frame and connected by a rod 106ª to a foot treadle by which it may be drawn downward. The front of the lever 106 is connected to a rod 107 which at its upper end is connected to a disengaging latch 510 stressed upwardly by a spring 511 (see Fig. 6), but normally maintained in lower, inoperative position by means of the blocking lever 105 while the cutting press is operating and while the cutting press shaft is clutched to the constantly driven large gear 54 rotatably mounted on said shaft.

The clutch employed to connect the gear 54 to the press shaft 26 is of a well known type permitting engagement of the driving and driven members at a single point only of angular relationship. It will suffice here to explain that the hub 54ª of the large gear wheel 54 is formed with a socket adapted to make engagement with a locking pin 508 slidingly mounted in the hub 509 of the driven member 108 of the clutch, which latter is secured to the shaft 26. The pin is stressed by a compression spring towards the hub 54ª, and is arranged to normally engage the socket of the hub 54ª of the gear wheel to lock the gear wheel to the shaft while the cutting press is in operation.

The locking pin 508 is formed with a cam face arranged as the clutch elements rotate to be carried into contact with a cam face on the spring-stressed rocking latch 510 when the latter reaches its upper position, see Fig. 6, which latch, it will be remembered, is normally held by the rod 107 and blocking lever 105 in lower position out of path of movement of the pin while the cutting press continues to operate.

When the shaft 88 is rocked (either by the rock arms 90—90 at the end of the last feeding movement of the feeding carriage, or a handle 88ª provided for manual operation, if desired) to disengage the blocking lever 105 and permit the rod 107 and latch 510 to rise, the cam face of the latch will be brought into the path of movement of the cam face on the locking pin 508 and cause a delayed disengagement of the clutch after the final stroke of the cutting press has been completed and when the cutting elements of the press have reached uppermost position, the gear wheel 54 continuing thereafter to rotate idly upon the shaft 26.

When it is desired to start the machine again, after the insertion of a fresh sheet, the foot treadle is operated to draw the lever 106, rod 106ª and connected rod 107 downwardly, thus shifting the latch 510 to inoperative position, and at the same time restoring the blocking lever 105. Re-engagement of the clutch elements obviously will not take place until the gear 54 has rotated to the single position of engagement of the clutch members, thus restoring the timed relationship of the parts for proper operation of the machine.

The rocking of the shaft 88 serves not only to effect delayed disengagement of the cutting press mechanism, and consequently the forward intermittent feed of the sheet-feed frame which is connected by pawl and ratchet to the cutting press shaft 26, but also serves to effect engagement of the clutch members 86 and 87 in the train of connections by which the sheet-feed frame is returned to rearward movement, through a connection controlled by the final return stroke of the pawl carrying arm 58.

To this end the rock shaft 88 carries a rock arm 91 (see Fig. 14) to which is pivoted a swinging cam plate 92 adapted to drop behind a roller 93 carried by the lower end of a lever 94 intermediately pivoted on the supporting frame. The pawl-carrying arm 58 is formed with an extension 58ª equipped with a cam roller 94ª adapted to cooperate on the return movement of the pawl arm with a cam surface formed on the front face of the cam plate 92 and force the lower end of the lever 94 towards the front of the machine, thereby pulling in the opposite direction a connecting rod 95 which is adjustably connected to a bell-crank lever 96 at the outer end of the stationary supporting frame,—see Figs. 14 and 8. Through a link 97, a bell-crank lever 98, a second link 99, and a second bell-crank lever 100, one end of which is equipped with a pin 101 engaging a groove in the hub of the sliding clutch member 87, the latter is shifted into engagement with the cooperating clutch member 86 to transmit power to the shaft 85 and connected parts when the return movement of the pawl-carrying arm 58 occurs,—see Fig. 8.

The bell-crank lever 96 is preferably provided with a handle 96ª to enable the operator to return the carriage or feed frame at any point in its travel which may be desired,—see Figs. 3 and 8.

As the feed frame reaches the limit of its return movement the outer end of the stop bar 12 of the frame contacts a roller 102 on the pivot of the joint between the bell-crank lever 98 and link 99, and through such link and the connected bell-crank lever 100 shifts the movable clutch member 87 to disengaging position, (see Fig. 8) the feed frame then coming to rest into position for another sheet to be inserted by the operator.

It will be understood that the angular relation of the eccentric 25 through which the cutting press head is reciprocated, and the eccentric 55 through which the ratchet mechanism is operated to give the sheet-feed frame its step-by-step movement, and the cam 131 by means of which the bars 37 and rear grippers 38 are actuated to withdraw the connected severed strips from the zone of the cutting members of the press, all of which are secured to the cutting press shaft 26, is such that the sheet metal blank will be fed forwardly into position to be operated upon while the press head is in upper position, and that the pawl of the ratchet mechanism will be retracted while the press head is in lower position, and also that the movement of the bars 37 is so timed as to start removal of the strip immediately after the upper die members have cleared them and, after the rear grippers have cleared the upper face of the leading strip and the push rod 46 has been reciprocated to quickly eject the pair of strips, the bars will then return to inner position, camming the grippers 38 upwardly in time to permit the leading edge of the succeeding pair of connected strips to stop against the stop shoulders of the grippers, after which the descending press head acts upon the cam blocks 43 to cause the grippers 38 to quickly snap into clamping engagement against the strips, as before described.

*Connections for operating rear grippers*

The reciprocating bars 37 carrying the grippers 38 by means of which the two-part adherent strips are withdrawn from between the cutting members of the press are actuated in synchronism with such members and given the timed movements before described through a cam 131 which is secured to the main cutting press shaft 26 and is formed with a side groove arranged to receive a cam roller carried by the upper end of a rocking lever 132 pivoted at its lower end to a block 133 confined between a stop 134 and a spring 135 on a connecting rod 136 which at its lower end is pivotally connected with a rock arm 137 fixed to a rock shaft 138 journaled in bearings carried by the punch press frame. To this rock shaft are secured two depending arms 139 which through links 140 are severally connected to the bars 37.

Inasmuch as the inner ends of the bars 37 are shouldered to serve as stops to position the leading edge of the metal sheet under the cutting mechanism, it is important that they shall be stopped with accuracy. To provide for this the outer ends of the bars are equipped with lugs 37a engaged by adjusting bolts 37b which bring up against a contact face on the cutting press frame and limit the stroke accurately. The yielding connection between the lever 132 and rod 136 provided by the spring 135 stresses the bars into the exact position of adjustment given by the bolts and provides for some range of adjustment.

*Connections for operating strip-ejectors*

The push rod 46 which acts to shift the frictionally adherent strips cut from the sheet metal blank laterally after they have been punched apart and reunited is operated through a sprocket wheel 120 secured to the outer end of the shaft 80 which engages a sprocket chain 121 also engaged by a sprocket wheel 122 rotatably mounted in a bearing bracket 123 fixed to the punch press frame. To the hub of this sprocket wheel is fixed a bevel gear 124 meshing with a bevel gear 125 secured to a short shaft 126 journaled in the bearing bracket 123 and a similar bracket 123a, also fixed to the cutting press frame,—see Figs. 1 and 5. A cam 127 secured to the shaft 126 is formed with a side cam groove arranged to receive a cam roller 128 intermediately mounted on an oscillating lever 129 which is pivotally mounted at its lower end upon the bearing bracket 123a and at its upper end is connected by a link 130 with the end of the spring barrel 48 to which the push rod 46 is connected.

The pairs of connected strips successively delivered by the push rod 46 as described then pass through three pairs of lower and upper rollers, marked respectively 141—141a, 142—142a and 143—143a, nd other mechnisms of the machine to which the present invention does not relate, by means of which they are acted upon to form the completed caps of the type hereinbefore mentioned.

I claim:

1. In combination with mechanism for cutting metal sheets, sheet-feeding mechanism comprising a stationary frame, a movable frame arranged to be connected to said sheets slidingly mounted in said stationary frame, actuating means for imparting a step-by-step forward movement to said movable frame, a second actuating means for imparting a continuous return movement to said movable frame, contact members on said movable frame arranged to automatically disable said first mentioned actuating means and render operative said second actuating means at the final forward shift of said movable frame, and means controlled by the rearward movement of said movable frame for automatically disabling said second actuating means.

2. In combination with mechanism for cutting metal sheets, sheet-feeding mechanism comprising a stationary frame having guideways arranged to receive the side edges of the metal sheets, a movable frame arranged to be connected to said sheets slidingly mounted in said stationary frame, a pair of grippers at the front of said movable frame arranged to clamp a sheet in said guideways to said movable frame, actuating means for imparting a step-by-step forward movement to said movable frame, a second actuating means for imparting a continuous return movement to said movable frame, contact members on said movable frame arranged to automatically disable said first mentioned actuating means and render operative said second actuating means at the final forward shift of said movable frame, and means controlled by the rearward movement of said movable frame for automatically disabling said second actuating means.

3. In combination with a cutting press having an operating shaft and a reciprocating die head connected to said shaft, said operating shaft having secured to it a driven clutch member arranged to normally engage a driving clutch member geared to a source of power, means for feeding metal sheets to said press comprising a stationary frame and a movable frame slidingly mounted on said stationary frame, actuating means for giving said movable frame an intermittent forward movement including a ratchet wheel carried by a forward shaft connected to said movable frame and a pivoted pawl-carrying arm and a pawl on said arm cooperating with said ratchet and a rod connected to one end of said arm and an eccentric on said press operating shaft connected to the other end of said rod, actuating means for giving said movable frame a continuous return movement including a rear shaft having secured to it a driving clutch member geared to said source of power, said rear shaft also carrying a rotatably mounted normally disengaged driven clutch member connected to said movable frame, a contact element in the path of said movable frame shifted by the movable frame at its final forward step, said contact element being arranged to effect disengagement of said first mentioned clutch members and also effect engagement of said second-mentioned clutch members, and a second contact element in the path of said movable frame and shifted thereby to effect disengagement of said second-mentioned clutch members.

4. In combination with a cutting press having an operating shaft and a reciprocating die head connected to said shaft, said shaft having secured to it a one-point driven clutch member having a cam face and arranged to normally engage a driving clutch member geared to a source of power; means for feeding metal sheets to said press comprising a stationary frame and a movable frame slidingly mounted in said stationary frame, actuating means for giving said movable frame an intermittent forward movement including a ratchet wheel carried by a forward shaft connected to said movable frame and a pivoted pawl-carrying arm and a pawl on said arm cooperating with said ratchet and a rod connected to one end of said arm and an eccentric on said press-operating shaft connected to the other end of said rod, actuating means for giving said movable frame a continuous return movement including a rear shaft having secured to it a driving clutch member geared to said source of power, said rear shaft also carrying a rotatably mounted normally disengaged driven clutch member geared to said movable frame, a contact element in the path of said movable frame shifted by the movable frame at its final forward step, a movable cam member arranged to be shifted into and out of cooperative relation with the cam face on said first mentioned driven clutch member, said cam being arranged to disengage said clutch member at the top of travel of said die head and said contact element being operatively connected to control the movement of said cam member into operative position, a second movable cam member arranged to be shifted by said contact member into cooperative relation with said pawl-carrying arm on the return stroke of said arm, said cam member being arranged when operated by said arm to shift said normally disengaged driven clutch member of said second-mentioned clutch to position of engagement, whereby the shift of said contact member will effect disengagement of said first-mentioned clutch members in upper position of the die head and will effect engagement of said second-mentioned clutch members upon the final return stroke of the pawl-carrying arm, and a second contact element in the path of said movable frame shifted by the movable frame at the end of its return traverse and operatively connected with the driven clutch member of said second mentioned clutch to shift it to disengaged position.

5. In combination with a cutting press having an operating shaft and a reciprocating die head connected to said shaft, said shaft having secured to it a one-point driven clutch member having a cam face and arranged to normally engage a driving clutch member geared to a source of power; means for feeding metal sheets to said press comprising a stationary frame and a movable frame slidingly mounted in said stationary frame, actuating means for giving said movable frame an intermittent forward movement including a ratchet wheel carried by a forward shaft connected to said movable frame and a pivoted pawl-carrying arm and a pawl on said arm cooperating with said ratchet and a rod connected to one end of said arm and an eccentric on said press-operating shaft connected to the other end of said rod, actuating means for giving said movable frame a continuous return movement including a rear shaft having secured to it a driving clutch member geared to said source of power, said rear shaft also carrying a rotatably mounted normally disengaged driven clutch member geared to said movable frame, a rock shaft journaled in said stationary frame and provided with a contact arm arranged to rock said shaft at the final forward step of said movable frame, said rock shaft being provided with two rock arms, a rocking latch having a cam face arranged to be shifted into and out of cooperative relation with the cam face on said first-mentioned driven clutch member, said cam face on the latch being arranged to disengage said clutch member at the top of the travel of said die-head and one of said rock arms on the rock shaft being operatively connected to control the movement of said rocking cam latch into operative position, a contact bar pivoted to a second one of said rock arms and formed with a cam face arranged to be shifted by the rocking of said rock shaft into cooperative relation with said pawl-carrying arm on the return stroke of such pawl-carrying arm, said bar being operatively connected with the said normally-disengaged driven clutch member of said second-mentioned clutch and arranged to shift it into position of engagement, whereby the rocking of said contact arm and rock shaft will effect disengagement of said first mentioned clutch members, and also effect engagement of said second-mentioned clutch members, and a second contact element in the path of said movable frame and shifted thereby to effect disengagement of said second-mentioned clutch members.

6. A cutting press and sheet-feed structure according to claim 5 in which the recited rocking latch having a cam face is spring-stressed towards position of disengagement and maintained normally in engaged position by a blocking lever operatively connected with said rocking cam latch and in which the recited first one of the rock arms on the recited rock shaft is connected to said blocking lever and arranged to shift it out of blocking engagement.

7. A cutting press and sheet-feed structure according to claim 5 in which the recited rocking latch having a cam face is spring-stressed towards position of disengagement and the latch is connected by a rod to the starting lever pivoted on the frame, and in which the first mentioned one of the rock arms on the recited rock shaft is connected by a rod with a spring stressed blocking lever pivoted on the frame and arranged to block movement of said starting lever, said starting lever being operable at will to restore the cam latch and blocking lever to position of engagement.

8. In combination with a cutting press for cutting metal sheets and including stop members arranged to stop the front edges of the sheets at cutting position, sheet-feeding mechanism comprising a sliding frame arranged to engage the rear edges of the sheets, and actuating means connected to the frame for imparting a step-by-step forward feeding movement thereto, the length of travel imparted by the actuating means being in excess of the movement permitted by the stop members and the connection being a frictional connection providing for slippage after the front edge of the sheet is stopped at cutting position.

9. In combination with a cutting press for cutting metal sheets and including stop members arranged to stop the front edges of the sheets, sheet-feeding mechanism comprising a sliding frame arranged to engage the rear edges of the sheets, and actuating means connected to the frame for imparting of step-by-step forward feeding movement thereto, including a shaft geared to the frame, a ratchet wheel on said shaft having a yielding frictional engagement therewith, a pawl arm rotatably mounted on said shaft and a pawl carried by said arm, and means for oscillating said arm, the length of travel imparted by the stroke of the pawl being in excess of the movement permitted by the stop members, whereby slippage between said shaft and ratchet wheel will take place after the front edge of the sheet connected to the frame is stopped at cutting position.

10. In a machine of the character described having a main power shaft and a press-operating shaft having a one-point clutch connection with said power shaft and a reciprocating die head eccentrically connected to said press-operating shaft and a sheet-feeding frame, said frame being also connected to said press-operating shaft by an eccentric and a reciprocating rod and a pivoted vibrating arm and a pawl on said arm and a ratchet wheel connected to a driving shaft geared to said sheet feeding frame and arranged to impart an intermittent feeding movement to said frame, means for effecting delayed disconnection of said main power shaft and said press-operating shaft at the upper position of the die head after the final feeding stroke of the sheet-feeding frame including a cam face on the driven member of said clutch connection, a movable cam element arranged to cooperate with said cam face at the upper position of said die head, and a contact member operatively connected with said cam element and arranged to be shifted by said feeding frame at its final feeding movement.

11. In a machine as recited in claim 10, means for effecting continuous return of the sheet-feeding frame after its final forward feeding movement including a rotating shaft having a geared connection with the main power shaft and having a driving-clutch element normally disconnected with a driven clutch element connected to said frame, a movable cam element arranged to be shifted by the final forward feeding movement of said frame into cooperative connection with said driven clutch element, and a cam surface on the recited vibrating arm arranged to cooperate with said movable cam element on its return stroke to shift said driven clutch element in engagement with said driving element.

12. In mechanism for feeding metal sheets, a stationary frame having supporting faces for the sheets, a sliding frame mounted in said stationary frame, spring-pressed gripper members intermediately pivoted on said sliding frame near its front end and arranged to clamp the rear edges of the sheets to said frame, a rock-shaft pivoted on said stationary frame equipped with cam members adapted to cooperate with said gripper members to rock them into release position upon rearward movement of said sliding frame, means for turning said shaft and cam members to disengage said cam members and permit said grippers to return to gripping position, and a contact member on said sliding frame to the rear of said gripper members arranged upon forward movement of said sliding frame to restore said cam members into position to cooperate with said gripper members.

13. In mechanism for feeding metal sheets, a stationary frame having supporting faces for the sheets, a sliding frame mounted in said stationary frame, spring-pressed gripper members intermediately pivoted on said sliding frame near its front end and arranged to clamp the rear edges of the sheets to said frame, a rock-shaft pivoted on said stationary frame equipped with flat sided disks adapted when their rounded faces are lowermost to engage the upper faces of the rear ends of said gripper members and rock them to release position upon rearward movement of said sliding frame, manually operable means for turning said shafts and disks to turn the flat side of the disks to lowermost position, a rock arm on said rock shaft, and a contact member on said sliding frame arranged to rock said rock shaft and automatically restore said disks into position to cooperate with said gripper members.

14. In combination with a cutting press having a die head for cutting metal sheets and a press shaft to which said die head is connected, sheet-feeding means including a stationary frame, a sliding frame mounted in said stationary frame equipped with means for attachment to said sheets, forward and rear shafts rotatably mounted in said stationary frame, sprocket wheels on said shafts and a sprocket chain engaging said sprocket wheels connecting said shafts and secured to said sliding frame, means for imparting an intermittent feeding movement to said frame including a clutch on said press shaft, means for imparting a continuous return movement to said frame including a second clutch on said rear shaft, contact means in the path of a part of said frame for disconnecting said first mentioned clutch member and connecting said second clutch member governed by the final feeding movement of said frame, and means governed by the movement of the carriage for disconnecting said second clutch member at the conclusion of its return travel.

15. A cutting press mechanism for forming intermeshed frictionally connected double strips from sheet material having a reciprocating die head and an upper die member formed with a straight rear edge and a toothed front edge, a stationary lower rear anvil member having a straight front edge, a stationary lower front anvil member having a toothed rear edge, said toothed edges of said upper die member and said lower front anvil member being formed to make a cut between the adjacent strips providing a frictional connection, and a yielding intermediate lower die member having a straight rear edge and a toothed front edge arranged to yield and permit cooperation of said upper die member with said lower anvil member and return the rear severed strip thereabove into frictional connection with the forward severed strip.

16. A cutting press mechanism for cutting sheet material including a reciprocating die head equipped with upper die members and cooperating stationary lower die members, means for feeding the sheet material toward the rear of the machine having a step-by-step forward feeding movement, reciprocating stop members arranged to be shifted from the rear of the machine into position to stop sheets fed by the feeding mechanism, grippers on said stop members arranged to be automatically opened in advance of the feeding movements of the sheets, a contact member on said die head cooperatively connected with said grippers near the end of its descending movement to close such grippers, and means for retracting said stop members and closed grippers after the cutting of the sheet.

17. A cutting press mechanism for cutting sheet material including a reciprocating die head equipped with upper die members and cooperating stationary lower die members, means for feeding the sheet material toward the rear of the machine having an intermittent feeding movement, reciprocating stop members arranged to be shifted from the rear of the machine into position to stop sheets fed by the feeding mechanism, grippers on said stop members arranged to be automatically opened in advance of the feeding movements of the sheets, means for closing said grippers governed by the descending movement of the die head, means for retracting said stop members and closed grippers after the cutting of the sheet, and a reciprocating pusher rod arranged to shift the severed material transversely of the machine while said stop members are in retracted position.

18. A cutting press mechanism for cutting sheet material including a reciprocating die head equipped with upper die members and cooperating stationary lower die members, means for feeding the sheet material toward the rear of the machine having an intermittent feeding movement, reciprocating stop members arranged to be shifted from the rear of the machine into position to stop sheets fed by the feeding mechanism, grippers on said stop members arranged to be automatically opened in advance of the feeding movements of the sheets, means for automatically closing said grippers prior to the cutting of the sheet, means for retracting said stop members and closed grippers after the cutting of the sheet, and a reciprocating pusher rod arranged to shift the severed material transversely of the machine while said stop members are in retracted position.

19. A cutting press mechanism according to claim 17 in which the severed material held by the gripper is stopped by other stop members and the grippers are drawn out of engagement with the material during the further movement of the reciprocating stop members, and in which the path of the reciprocating pusher rod intersects the path of the reciprocating stop members adjacent said other stop members.

20. In a cutting press mechanism for cutting sheet material having a reciprocating die head and feeding mechanism and reciprocating stop members arranged to be shifted from the rear of the machine into position to stop sheets fed by the feeding mechanism, said stop members being equipped with spring-pressed rocking gripper members, means for opening and closing said gripper members respectively each including a pivoted cam block, the cam face at the end of said block being arranged in the path of movement of a cam surface on its associated rocking gripper member, whereby said gripper member is cammed to open position when shifted from the rear of the machine into stopping position of said stop members, and said pivoted block being arranged to be rocked by said die head near the end of its descending stroke to disengage said block from said gripper member and permit it to close.

21. In a cutting press mechanism for cutting sheet material having a reciprocating die head and feeding mechanism and reciprocating stop members arranged to be shifted from the rear of the machine into position to stop sheets fed by the feeding mechanism, said stop members being equipped with spring-pressed rocking gripper members, means for opening and closing said gripper members respectively each including a pivoted cam block equipped with a roller at its lower end, said roller being arranged in the path of movement of the rear end of its associated rocking gripping member, whereby said gripper member is cammed to open position when shifted from the rear of the machine into stopping position of said stop member, and said pivoted block being arranged to be rocked by said die head near the end of its descending stroke to shift said roller rearwardly past the end of said gripper member and permit it to close.

22. In a press for cutting sheet material, feeding mechanism arranged to yieldingly advance the material step-by-step to the cutting mechanism, reciprocating stop members arranged to shift from the rear of the machine into position to stop sheets advanced by the feeding mechanism, a yielding connection for reciprocating said reciprocating stop members, and an adjustable stop for limiting the stroke of said reciprocating members to stopping position.

23. In a cutting press mechanism for forming intermeshed frictionally connected sections of sheet metal or like sheet material, die members including a stationary anvil member formed with a toothed edge on one side and a straight edge on its opposite side, and a punching member formed with a complementary toothed edge and a straight edge arranged to cooperate with said toothed and front edges of the anvil member, and a yielding restoring member disposed below said punching member, the toothed edges of said anvil member and said punching member being formed to make a cut providing for frictional connection between the severed parts and said yielding restoring member acting to return the severed strip into frictional connection along the toothed line of cut.

24. In a cutting press mechanism for forming intermeshed frictionally connected sections of sheet metal or like sheet material, die members including a stationary anvil member formed with a toothed edge on one side and a straight edge on its opposite side, and a punching member formed with a complementary toothed edge and a straight edge arranged to cooperate with said toothed and front edges of the anvil member, and a yielding restoring member disposed below said punching member and formed with a toothed edge registering with the teeth on said punching member and a straight edge registering with the straight edge on said punching member, the toothed edges of said anvil member and said punching member being formed to make a cut providing for frictional connection between the severed parts and said yielding restoring member acting to return the severed strip into frictional connection along the toothed line of cut.

25. In mechanism of the character described, means for feeding sheets of material, cutting press members arranged to sever pairs of strips from said sheets, said cutting members being formed with teeth arranged to make a cut providing for frictional connection at the meeting edges of the members of each pair, restoring members associated with said cutting members arranged to restore the rearward strip of the pair into frictional connection with the forward strip along the line of cut, and reciprocating gripper members arranged to grip the leading edge of the forward strip of the pair and withdraw the connected pair of strips from between the cutting and restoring members.

26. In mechanism of the character described, means for feeding sheets of material, cutting press members arranged to sever pairs of strips from said sheets, said cutting members being formed with teeth arranged to make a cut providing for frictional connection at the meeting edges of the members of each pair, restoring members associated with said cutting members arranged to restore the rearward strip of the pair into frictional connection with the forward strip along the line of cut, and means for feeding said connected pairs of strips as units from between the cutting and restoring members.

EDWIN V. SWANGREN.